(12) United States Patent
Sagayaraj et al.

(10) Patent No.: US 9,226,326 B2
(45) Date of Patent: Dec. 29, 2015

(54) PROXIMATE DEVICE LOCATOR

(71) Applicant: Verizon Patent and Licensing Inc., Basking Ridge, NJ (US)

(72) Inventors: Maria M. Sagayaraj, Tamil Nadu (IN); NarayanaDhoss Gopalakrishnan, Tamil Nadu (IN); Ganesh Ramasamy, Tamil Nadu (IN); Poothabalan Somasundaram, Tamil Nadu (IN); KrishnaKumar Sundaram, Erode (IN); Saravanan Vijayakumar, Tamil Nadu (IN); Arunkumar Surulinathan, Tamil Nadu (IN); Sundar Sivaraman, Tamil Nadu (IN); Ravi Chandra Appasani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 230 days.

(21) Appl. No.: 13/916,321

(22) Filed: Jun. 12, 2013

(65) Prior Publication Data

US 2014/0370891 A1 Dec. 18, 2014

(51) Int. Cl.
*H04W 4/00* (2009.01)
*H04W 76/02* (2009.01)
*H04W 4/12* (2009.01)
*H04W 4/02* (2009.01)

(52) U.S. Cl.
CPC .............. *H04W 76/021* (2013.01); *H04W 4/02* (2013.01); *H04W 4/12* (2013.01)

(58) Field of Classification Search
CPC ......... H04L 51/20; H04L 51/32; H04L 67/24; H04L 29/08; H04W 4/02; H04W 4/023; H04W 4/206; H04W 76/021
See application file for complete search history.

(56) References Cited

U.S. PATENT DOCUMENTS

| | | | |
|---|---|---|---|
| 2011/0238755 A1* | 9/2011 | Khan et al. | 709/204 |
| 2013/0012233 A1* | 1/2013 | Stremel et al. | 455/456.2 |
| 2014/0089410 A1* | 3/2014 | Ahmed | 709/204 |

* cited by examiner

*Primary Examiner* — Khalid Shaheed

(57) ABSTRACT

A user interested in a networked station, such as a mobile station of a particular type, can obtain information to enable the user to locate and/or contact another person with a station of the particular type, e.g. at a location within a set distance from or in proximity to the current location of the user's station. Alternatively, the user of the requesting networked station may provide identities of members of a social media network; and the system can then identify the members who are users of the particular networked station. In either case, the user of the requesting networked station can use the received information to obtain a first-hand review of the particular networked station or to contact another user to request a meeting to view of operate the particular station.

20 Claims, 9 Drawing Sheets

PROXIMATE DEVICE LOCATOR

BACKGROUND

Wireless communication services have expanded, and mobile stations are used by a large majority of people in developed countries around the world. Networks offer wireless mobile communication service for voice calls, mobile messaging services (e.g., text and/or multimedia) and data communications. The data communication capabilities of the mobile stations and the broadband data communication services offered by the networks enable users to perform more and more tasks from their mobile stations, and users expect to be able to do more and more.

Users of mobile stations routinely upgrade or otherwise replace their mobile stations. The typical way in which a user may replace his/her mobile station is through a purchase of a new mobile station. A user may replace the mobile station for many and various reasons. A user may, for example, purchase a new mobile station because it provides functionality desirable to that user. Such functionality may include the ability to browse the Internet at certain speeds, have a desired processor speed, or the like. When considering a purchase or upgrade, or when otherwise interested in a particular type of a mobile device, a user often wants information about the mobile device of interest and may want to view and operate the device to learn still more about the device. Users or prospective customers often are interested in a similar manner about information regarding a wide range of other types of devices.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
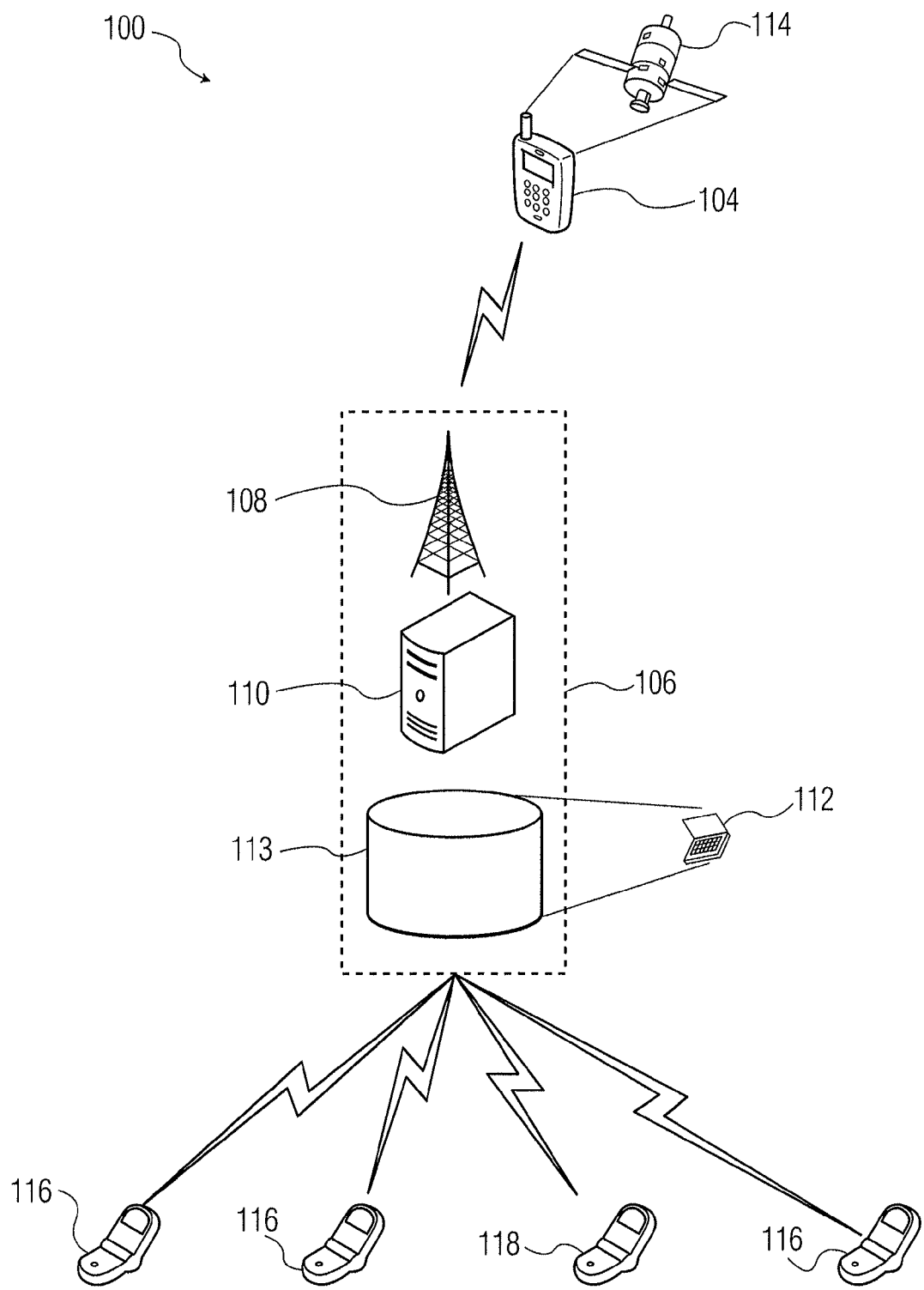
FIG. 1 is a simplified network diagram useful in understanding one example of proximate device location.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Technologies described throughout the disclosure relate to many types of devices connected to a communication network. These devices may include both mobile stations (e.g., smart-phones, tablets, etc.) and immobile stations (e.g., televisions, refrigerators, etc.). For discussion purposes, however, the examples below focus mainly on mobile stations communicating through a mobile wireless network and on models thereof that may be of interest to users or potential customers. It should be appreciated, however, that the technologies described throughout the disclosure may serve to provide users or potential customers with information about many other types of devices and/or may provide such information on many other types of user devices. The descriptions herein may be used for home appliances, with the increasing connectedness of such devices increasing.

Before purchasing a mobile station of a particular type, a user may desire to understand the functionality that the particular type of mobile station provides as well as interact with a working model of the station, which stores currently generally do not permit. For example, the user may want to know objective information about the type of mobile station, e.g., whether the mobile station provides Internet browsing, text messaging, etc. This information often is provided by the manufacturer of the mobile station. In addition to objective information, a user may want to know subjective information about a particular mobile station type, e.g., the "feel" or intuitiveness of the provided functions, or how users of the particular type of mobile station like the mobile station. Therefore, a user may desire to personally use the mobile station, and/or to receive input of whether other users of the mobile station type are satisfied with the mobile station before the user purchases the mobile station type.

A user of a mobile station, or the like, who is interested in a mobile station of a particular type (e.g. for a potential upgrade) can contact a person having a mobile station of that particular type. The contacting user can then obtain a review of the mobile station, can arrange for a meeting with the other person for a demonstration, or can arrange to try out the mobile station of the particular type. Examples of types of mobile stations may typically include the make and/or model of the particular mobile station, as well as any other structure or method used to identify the particular type of mobile station. Several examples discussed below generally relate to providing a review for a user, or a potential user, of a particular mobile station type.

A user may desire to obtain a review or demonstration of a particular type of mobile station for many and various reasons. The particular type of mobile station, for example, may be a newly released type of device. Conventionally, the user could search online for a review, or ask a sales associate at a local retail store for a review. However, these conventional methods are often undesirable due to bias or other inaccuracies. In particular, as ratings and comments on websites promoting various devices may be suspect, interaction with the devices and individuals who own the devices may be desirable. In addition, these conventional reviewers may not adequately convey intangible qualities of the mobile station, such as its look and feel, or the intuitiveness of the operation the mobile station type provides. Thus, users may desire to obtain a review or demonstration of a particular type of mobile station from other than conventional reviewers.

According to an example of a proximate device locator service, described in more detail below, a user may obtain contact information of other users of a particular type of mobile station based on a search. Contact information of the other user may include telephone numbers, email addresses, location information, social network handles, etc. The user can use this contact information to contact at least one identified other user. The other user may be limited to only those individuals connected to the user via one or perhaps two degrees of separation via social networking (e.g. Facebook, LinkedIn) or may not be so limited. In one example, after contacting the other user, the user can obtain a review of the particular type of mobile station from the other user. For instance, a user can call the other user using the other user's mobile telephone number. Or, the user can email, text, or otherwise message the other user using different types of contact information. In yet another example, the user could meet the other user, using location information of the particular type of mobile station. Once contacted, the user may ask the other user for a review of the mobile station, or may ask to meet with the other user to personally try out the mobile station.

In other examples, the user can request from the other user preferential dates, days, times, locations, etc. for a meeting between the user and the other user. The user, for example, may request preferential times from the other user by sending a text message, or other less intrusive communication methods. The other user can then decide if, or when/where, to provide a review, demonstration, etc. of the mobile station of the particular type to the user. In other examples, the other user can predefine contact information, locations, or days/times in which the other user is available to be reached. In this example, the other user is only contacted for a review, demonstration, etc. during times, dates, and locations of preference to the other user. Because the other user is only contacted when he/she wants to be contacted, better reviews or demonstrations are expected to result.

Reference is now made in detail to the examples illustrated in the accompanying drawings and discussed below. FIG. 1 illustrates an example of a system 100 for obtaining contact information of a particular type of mobile station based on a search. A user has a mobile station 104, 116, 118 for communicating with a wireless communication network 106. A variety of different types of mobile stations 104, 116, 118 supporting such communications are widely available. Mobile stations 104, 116, 118, for example, may take the form of portable handsets, smart-phones, tablet computers, personal digital assistants, televisions, or DVD players, although they may be implemented in other form factors.

For the purposes of this disclosure, mobile station 104 is the mobile station used by the user requesting a review, demonstration, etc. of a particular type of mobile station. Mobile stations of a particular type 118 include the mobile stations found in network 106 that the user has an interest in. One object of the proximate device locator system is to allow the user of mobile station 104 to retrieve information of the particular types of mobile stations 118 residing on network 106. Mobile stations 116, in contrast, are ancillary to the proximate device locator system. Mobile stations 116 are located within network 106, but are of a type that the user of mobile station 104 is not interested in at the moment.

In one example, mobile stations 104 include a standalone application for receiving information (e.g., contact information, location, etc.) about mobile stations 118 of a particular type. Information relating to the particular mobile stations 118 may be stored in a memory on the mobile station 104, or stored in the network 106 and transmitted to the mobile station 104. The mobile station 104 can access a cellular network and/or WiFi network for voice communications (i.e., telephone calls, push-to-talk, etc.), messaging, and content/data transfer. The network 106 allows the mobile station to communicate with other mobile stations, such as stations 116 and 118, as well as with landline telephone equipment and/or with various data devices.

Mobile station 104 may include a global positioning system ("GPS") chip 114. If GPS is enabled, mobile station 104 can determine the mobile station's location from processing of signals received from three or more of the satellites 114 of the GPS constellation. Depending on device capabilities, a GPS enabled mobile station may itself perform all functions to determine its location, or the mobile station may utilize some assistance offered by elements of the network 106. Other methods (such as trilateration or association with a particular base station) may also, or alternatively, be used to determine the location of mobile station 104 and provide the location information to the mobile station 104, e.g. for the user in the proximate device locator in our example.

A proximate device locator service of the type under consideration here may be provided by any of a number of different types of entities having access to communicate with users on their mobile stations 104, e.g. through any available wireless communication network 106. In an example, however, the proximate device locator service is offered by a carrier or other entity operating the wireless communication network 106. Therefore, elements specifically relating to that service are shown as parts of the network 106.

The network 106 in the example includes, or links, to elements for wireless mobile station communication as well as for content exchange related to the proximate device locator service. These elements may include a base station 108, a server 110, and a database 112. A mobile communication network typically includes various other elements for routing, control, accounting and the like, which are omitted here for ease of illustration and to help focus discussion on the proximate device locator service. The network 106 may include servers 110 and/or databases 112 for a variety of services offered by the operator of the network 106. Although, for purposes of further discussion of an example of a proximate device locator service, we will assume that the server 110 and database 112 participate in the proximate device locator service.

The database 112 may include a search query database. The search query database can be stored in at least one storage device 113 and may include records for the mobile station 104. The server 110 can take the form of server programming for execution on a processor of a computer or the like connected to the data communication media of the network 106. The computer/processor running the server programming may be the same, or different, hardware platform from that containing the storage device for the database 112.

As shown by way of example, there are multiple other mobile stations 116, 118 that communicate with the network 106 besides mobile station 104 of the user. The other mobile stations 116, 118 are typically operated by individual users. For purposes of the present discussion, mobile stations 118 are mobile station of a particular type that the user has an interest in, and mobile stations 116 are of a type that the user is not interested in at the moment. Server 110 may categorize mobile stations into mobile stations 118 and mobile stations 116 according to input received by user of mobile station 104.

Mobile stations 116, 118 may have GPS chips, or may be located by other methods, such as trilateration, and have access to the network 106 for communication in a manner similar to that discussed above relative to determining the location of mobile station 104. Server 110, or another device, can monitor the locations of mobile stations 104, 116, 118 using the GPS or some other method. In one example, server 110 receives the location information of mobile stations 104, 116, 118 from satellite 114. Location information of mobile stations 104 116, 118 may include latitude/longitude information, address information, relative location information, office location, etc.

Server 110 can filter the received locations of mobile station 104, 116, 118 so that only contact information regarding mobile station 104 and particular types of mobile stations 118 are stored in server 110 or database 112. For example, if the user of mobile station 104 desires to obtain a review or demonstration of X-phones only, server 110 can filter the received information so that only contact information (including locations) of mobile station 104 and X-phones are saved. In this example, the contact information of mobile stations 116, which are mobile station types of no interest to the user, will be removed or unsaved.

At a high level, the mobile station 104 receives a user input identifying a particular type of mobile station. The mobile station 104 determines its current first location. Mobile stations 104 can also set a distance within the current first location for locating mobile stations 118 of a particular type, for example, in response to user input, or by retrieving a previously stored setting value. The mobile station 104 can send an inquiry containing information identifying a particular type of networked station, mobile station 104's current first location and a set distance, through the wireless communication network 106 to server 110.

Server 110 may receive the inquiry for information (including location information) about a particular type of mobile station 118 from the requesting mobile station 104. In response, the server 110 identifies a first location of the requesting mobile station 104, and second locations of particular mobile stations 118 of the type that the user is interested in, and that have been within the set distance of the identified first location. For each respective one of the particular types of mobile stations 118, the server 110 also identifies contact information associated with the respective particular networked station 118, from the database 112, for example. As a response to the inquiry received from the requesting mobile station 104, the server 110 transmits information associated with the particular types of mobile stations 118 through a wireless communications network 106 to the requesting mobile station 104. Such information may include contact information associated with the particular type of mobile station 118, e.g., telephone number, email address, location information, relative distance between mobile stations 104 and 118, a social network handle, etc. The mobile station 104 can output some, or all, of the received contact information as a presentation to the user.

In an example, there may be a time factor associated with the monitoring of the individual mobile stations 104, 116, 118. In this example, the user defines the time factor and inputs the time factor into his/her mobile station 104. The time factor may be sent from mobile station 104 to server 110 via communication for further filtering the received information. The time factor can be a relevant time period (e.g., between the hours of 5 p.m. and 7 p.m.), or an absolute time (e.g., at or about 5 p.m.), over which information relating to a particular type of mobile station 118 is returned to mobile station 104. In one example, the time factor can relate to the time that mobile stations 116, 118 are expected to be at a certain location. For instance, in this example, the user of mobile station 104 can request mobile stations of a particular type 118 that will be at a location at a defined time, e.g., 5 p.m. In this example, the user of mobile station 104 may make the request at the defined time (i.e., the user may make the request at 5 p.m. for mobile station locations at 5 p.m.). Alternatively, users of mobile station 104 may make the request at a time prior to the defined time (i.e., the user may make the request at 4 p.m. for mobile station 118 locations at 5 p.m.). Server 110 can identify all mobile stations 116, 118 and filter the identified mobile stations 104 according to the time that the mobile station 118 was, is, or will be located within a predefined distance of user's mobile station 104 (or another location).

Figure 2:
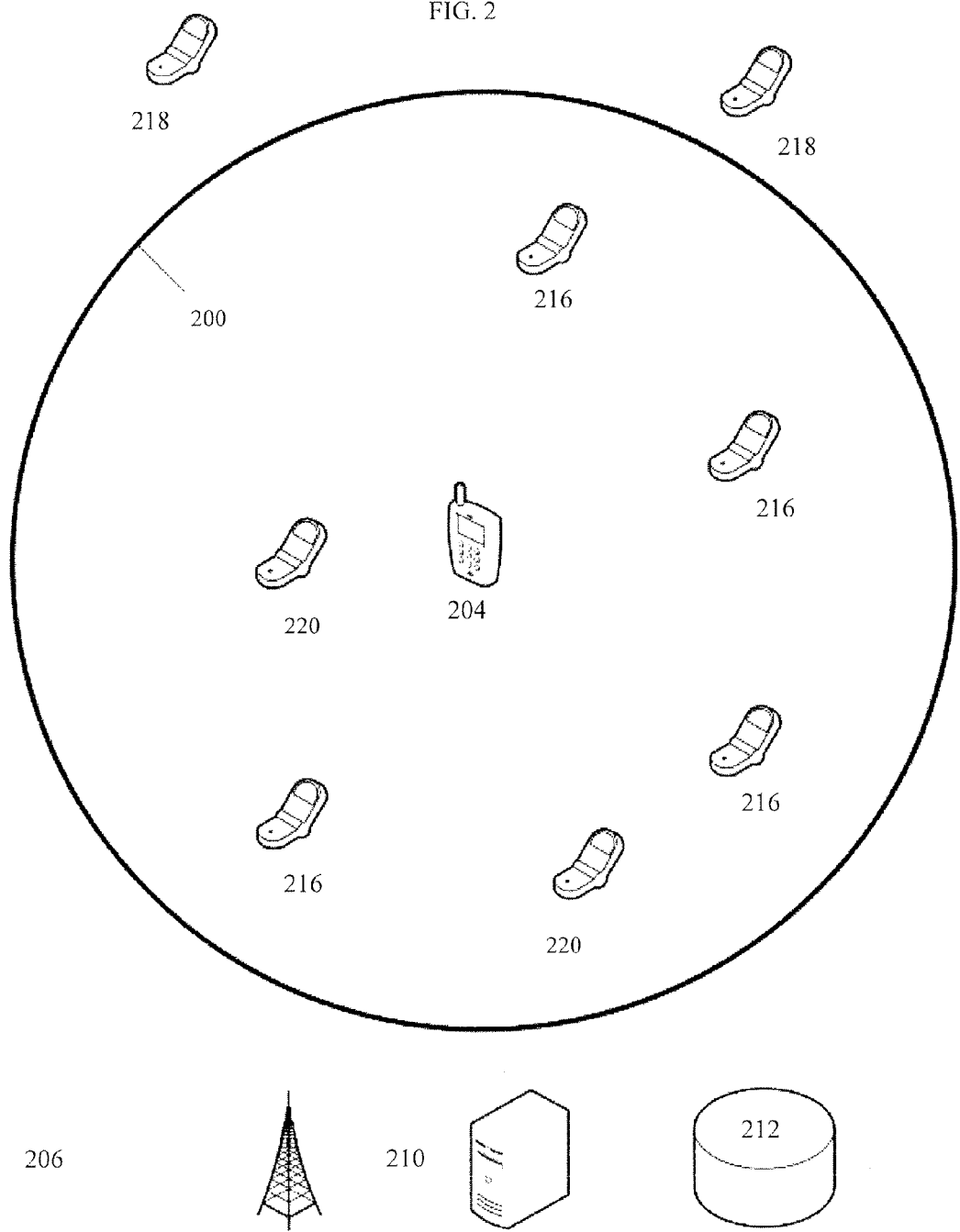
FIG. 2 illustrates a further example of the network and distances from a mobile station.

A user's mobile station can access location/search information in multiple ways. In one example, illustrated in FIG. 2, mobile stations 204, 216, and 220 are mobile stations connected to network 206. In this example, mobile station 204 is the requesting station, mobile stations 220 are mobile stations of the type that the user is interested in, and mobile stations 216 are mobile stations of the type that the user is not currently interested in. For example, user of mobile station 204 may be interested in a mobile station of the type R-phone. In this example, as shown in FIG. 2, server 210 scans network containing all mobile stations 216, 218, 220. For illustrative purposes, and for this example only, mobile station 216 may be an S-Phone, and mobile station 220 may be an R-Phone. Thus, as indicated above, user of mobile station 204 is interested in mobile station 220, which is an R-Phone. Accordingly, server 210 will filter the mobile stations 216, 218, 220 such that the mobile station of interest to the user, i.e., mobile station 220, is returned to mobile station 204.

In this example, contact information of a particular mobile station 220 may be delivered to the user's mobile station 204 based on the relative location between mobile station 204 and particular mobile stations 220. As an example, the relative location between mobile station 204 and mobile station 220 may be miles between the respective mobile stations 204, 220, as well as city blocks, office buildings, or any other ways in which distances from points are measured. Miles and city blocks are provided above. These measurements between mobile stations 204 and 220, however, may be given using various measuring systems, e.g., feet, yards, kilometers, etc. Alternatively, contact information of a particular type of mobile station 220 may be delivered to mobile station 204 based on an absolute position of mobile station 220. Such absolute positions of mobile station 220 may be presented to mobile station 204 via a point on a map indicating mobile station 220's location, latitude/longitude positions of mobile station 220, an office location, etc.

As another alternative, contact information may be based on no location information at all. In this alternative, the user of mobile station 204 may request contact information relating to mobile stations of a particular type 220, without requiring the location of the mobile station 220. This example is advantageous, for example, in situations in which the user of mobile station 204 only desires to call, text, or otherwise message the particular type of mobile station 220 to obtain a remote review of the particular type of mobile station 220.

Further, contact information of particular types of mobile stations 220 may be categorized and/or ordered according to their respective distances to mobile station 204. For example, mobile stations 220 that are within two miles of mobile station 204 may be categorized into a first category, mobile stations 220 that are within one mile of mobile station 204 may be categorized into a second category, mobile stations 220 that are within a half mile of mobile station 204 may be categorized into a third category, and so on. These categories (e.g., the first, second, third, etc.) may be ordered so that each user of mobile station 204 can choose the categories that most fit the needs of each respective user of mobile station 204.

FIG. 2 depicts an example of mobile station 204 and particular mobile station 220 within a radius 200 of the mobile station 204. Server 210 may determine the location of the mobile station 204 making the search request, and then determine the radius 200. The server 210 then determines which other mobile stations 216 and/or 220 are within the radius 200. Conversely, mobile stations 218 are outside the radius 200.

The determination of the locations of the other mobile stations 216, 218, 220 can be performed in multiple ways. One example of retrieving locations of mobile stations 216, 218, 220 includes a GPS chip in each respective mobile station transmitting location information of the mobile stations 216, 218, 220, as discussed above. In this example, server 21 receives the locations of mobile stations 216, 218, 220 via satellite 114 (FIG. 1), and the other methods discussed above. Server 210 may then store these locations in server 210 or database 212. In one example, server 210 may only store contact information (including location information) of mobile stations 216, 218, 220 that are within a predefined location. Thus, in this example, server 210 will only save contact information relation to mobile stations 216, 220 because these mobile stations are within the predefined two mile radius of mobile station 204. In other examples, however, server 210 may store the contact information (including location information) of all other mobile stations 216, 218, 220. In this example, after storing the information of all mobile stations 216, 218, 220, the server 210 may perform filtering of the stored mobile stations such that only mobile stations within the predefined distance to the mobile station 204 will be transmitted to mobile station 204. Thus, in this example, using FIG. 2 for illustrative purposes, contact information for mobile stations 216, 218, 220 will be stored in server 210 or database 212, but only contact information relating to mobile stations 216, 220 will be transmitted to mobile station 204.

Depending on how frequently the database 212 is updated with locations, the server 210 can send a location request to the other mobile stations 216, 218, 220 to determine if one of their locations coincides with the user's request. Server 210, however, only receives location information from mobile stations 216, 218, 220 having permissions set to provide such location information. Thus, if a user of a mobile station 216, 218, 220 has not consented to provide location information for the proximate device locator service, server 210 will not obtain this information. Nor will server 210 provide the contact information of such mobile stations 216, 218, 220 to mobile station 204.

In an example, once the mobile stations 216, 220 inside the radius 200 are determined, the server 210 can search the database 212 for the particular type of mobile stations 220 pertaining to the user's 102 request. In the examples below, the mobile station 204 makes a request for information relating to mobile stations of a particular type. As discussed above, however, mobile station 204 only receives information (e.g., contact information, location information, etc.) for the mobile stations 220 of a particular type in which users associated with the mobile device have consented to providing the information.

Further, permission categories may be implemented such that one or more administrators may control the setting, and/or permissions, of the mobile stations. In an example, the administrator may not be the same person or entity as the user of mobile stations 204, 216, 218, 220 (e.g., parent is administrator and child is user, company is administrator and employee is user). In an example, the administrator may designate the permissions for downloading/installing (or preventing download/installation of) the application of the present invention. If the administrator allows the application to be installed on a respective mobile station, the administrators may further designate the permissions for the mobile station. For example, the administrator may allow contact information to be distributed, but not allow contact information to be distributed, etc. Further, the administrator may designate one or more other users to be designated as administrators, and provide these other users with varying administrative privileges. For example, the administrator may allow another user of mobile station 220 to set all permissions, and allow yet another user of a mobile station 220 to change only a subset of privileges, e.g., to allow telephone information to be distributed.

In another example, information that can be returned to mobile station 204 may include the number of particular types of mobile stations 220 that are located in one or more particular regions. By providing to the user of mobile station 204 the number of particular types of mobile stations 220 at a certain location, the user is provided with, statistically at least, the best regions from which to receive a review or demonstration of the particular type of mobile stations 220. In one example, server 210 can rank a region A higher than region B if there are more particular types of mobile stations 220 located at region A than located at region B. Using this example, user would have more opportunities, statistically, to receive a first-hand review or demonstration from mobile station 220 at region A than from mobile station 220 at region B. Alternatively, in other examples, users of particular types of mobile stations 118 may contact the user of mobile station 104, e.g., to provide the review or demonstration. In this example, the user of the mobile station 204 indicates an interest in a particular type of mobile station 220, and possibly a location to search. Particular types of mobile stations 220 within the provided location are searched for, and identified by server 210, or other device. The user of the particular type of mobile station 220 receives, via network 206, contact information (e.g. telephone number, email address, etc.) of interested users of mobile station 204. Using this contact information of mobile stations 204, the user of mobile station 220 may choose, on a case-by-case basis, whether to contact user of the mobile station 204 to provide a review, demonstration, etc. of the particular type of mobile station 220.

After contact information is provided to mobile stations 204 or 220, respective users can use that information to contact the other users. The user of mobile station 204, for example, can ask the other user (of the particular type of mobile station 220) for a review, demonstration, etc. of the particular type of mobile station 220. For example, the user can ask the other user if he/she is satisfied with the particular mobile station 220. The user of mobile station 204 can also ask the other user for a meeting to see the mobile station 220 first-hand, and possibly even to operate mobile station 220. Reviews, or opportunities to view and/or use a desired type of station, offered by the proximate device locator service, are desirable over conventional reviews because they allow the user to obtain first-hand information about an actual user's experience with a mobile station of a particular type. This information can be used by the user as one factor in whether to purchase a particular type of mobile station 220.

Figure 3:
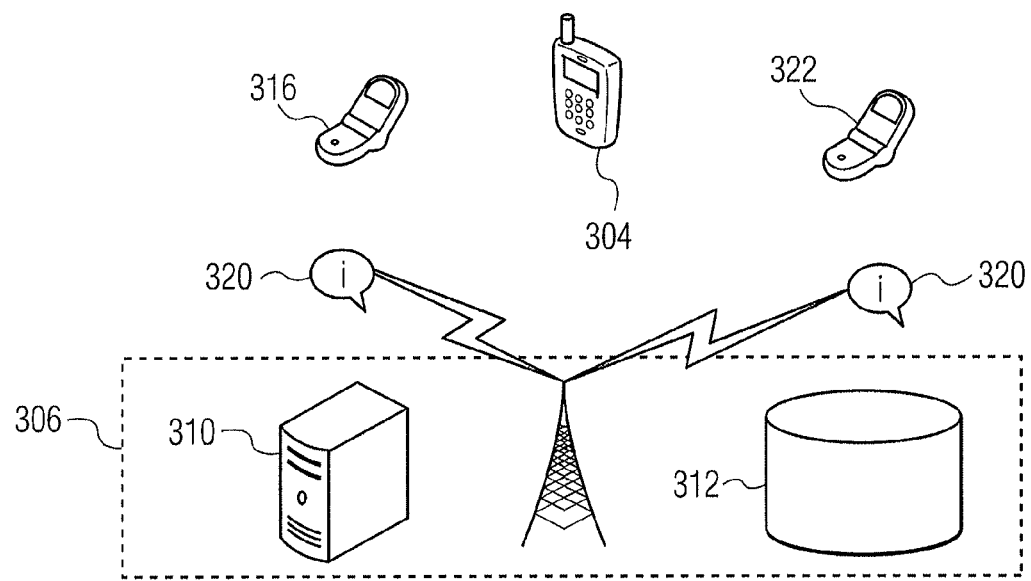
FIG. 3 illustrates a network example that includes probes.

In another example, which may be used in conjunction with the previous examples and illustrated in FIG. 3, the server can be a search query server 310. The search query server 310 may be configured to perform functions, including obtaining the locations of types of mobile station types 322 that user is interested in, as well as distance restrictions from the particular types of mobile stations 322. In this example, the requesting user uses mobile station 304, and mobile stations 316 are of no interest to the user of mobile station 304.

The search query database 312 may be populated by probes 320. Probes 320 transmit location information from mobile stations 304, 316, 320, 322. Probes 320 may be built into an application of the mobile stations 304, 316, 322 to collect contact information (e.g., telephone numbers, location information, etc.) pertaining to the particular types of mobile stations 322. The probes 320 can submit the information to the search query server 310 on the network 306 each time a search application is used. Probes 320 may be standalone, or they may coexist with other libraries used by the application.

Information provided to the search query server 310 may be sorted and filtered. Aspects of the exemplary proximate device locator service may ensure that information will not be distributed to users of mobile stations 304 when users of particular types of mobile stations 322 decline to consent to dissemination of such information. In one example, search query server 310 filters the information according to permissions set on or by each particular mobile station 322. Thus, in this example, only information that users of mobile stations 322 consent to provide will be available to mobile station 304, and vice-versa.

In alternatives, information regarding particular types of mobile stations 322 may be sorted by search query server 310 according to mobile stations that provide more, or less, information to mobile station 304. As indicated throughout the disclosure, a user (or administrator) may define permissions for providing information to other users of mobile stations 304, 316, 322. Users who provide all requested information (e.g., all contact information, location information, etc.) may be located on one end of the permissions spectrum. Alternatively, users who provide no requested information (e.g., no contact information, no location information, etc.) may be located on the other end of the permission spectrum. Between these two ends of the spectrum, users allowing varying levels of permissions may be found.

In one example, search query server 310 identifies all levels of permissions for the particular types of mobile stations 322. Server 310 then categorizes and sorts mobile stations 322 according to the permissions provided for each respective mobile station 322. In an example, users of mobile stations 322 who provide the most information (i.e., users who place the fewest restrictions on contact information, etc.) may be located at the top of a list stored in search query database 312. Conversely, users of mobile stations 322 that allow less information (i.e., users who place more restrictions on contact information) may be located further down the list. In other examples, the particular types of mobile stations 322 may be sorted according to other information, e.g., mobile station plan, area code, etc.

The probes 320 may be a standalone application, submitting the locations of mobile station 304 and particular mobile stations 322 to the search query server 310 and/or the search query database 312. The probes 320 may be stored in a memory (not illustrated) on the mobile station 304, 316, 322, or stored on search query database 312 and transmitted to the mobile station 304, 316, 322 via network 306 upon instruction of the search query server 310. Alternatively, the probes 320 may be built into an application that registers itself with the search query server 310 and/or the search query database 312 periodically when in use, or upon startup.

In a further example, referring back to FIG. 1, the information about the particular types of mobile stations 118 can include the number of mobile stations 118 within a set distance of the user device 104. This number can be stored in database 112, and retrieved by server 110. A set distance, and a set time frame, can be manually entered by the user via mobile station 104. Alternatively, mobile station 104 may include preset distances and time frames.

In one example, identifying a relevant search result includes identifying the distance to the particular types of mobile stations 118 and determining if the mobile stations 118 fall within a relevant radius around mobile station 104. Identification may additionally include scanning for mobile stations 118 that were, or are, inside the radius, and making a relevant identification within a set time frame. As provided above, the time frame can be standard, or preset, by the user. Contact information (e.g., telephone number, email address, location information, social media network identification, etc.) associated with mobile stations 118 of a particular type within a desired location, can be provided to the user by way of mobile station 104. The user of mobile station 104 can use this information to contact the user of the particular type of mobile station 118 and obtain a review or demonstration of mobile station 118.

Figure 4:
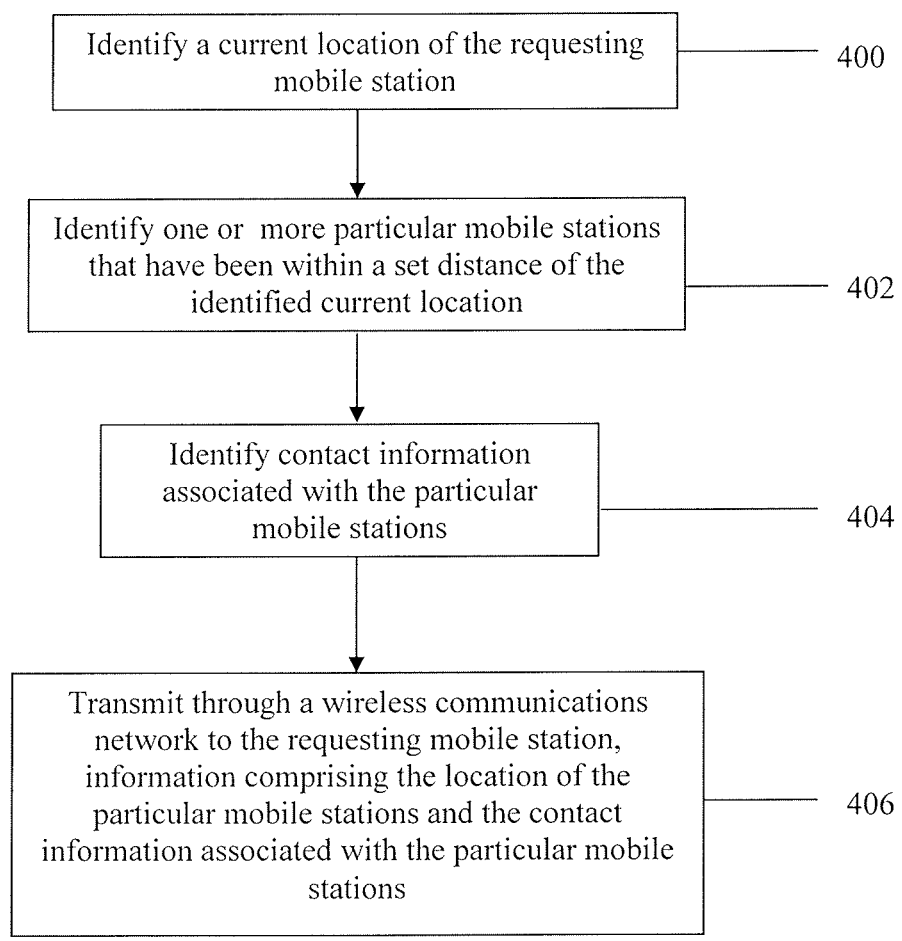
FIG. 4 is a flow chart outlining an example of a searching method.

FIG. 4 illustrates an example of a location based method of delivering a first-hand review, demonstration, etc., of one or more particular types of mobile stations 118, to the user of the requesting mobile station 104. For purposes of discussion, the method will refer to FIG. 1, and the elements of that figure. However, the method depicted in FIG. 4 should not be limited to the elements of FIG. 1.

The method of delivering a first-hand review, as depicted in FIG. 4, includes the step of identifying a current location of mobile station 104 (Step 400). One or more particular types of mobile stations 118 that have been within a set distance of the identified location at any time within a set time frame can then be identified (Step 402). Other steps can include predicting mobile stations of particular types 118 that will be at predefined locations at set time frames. Another step, for example, can include a user of mobile station 104 setting a location and a time, wherein the set time is some future time. Server 110 can identify users of mobile stations 118 who have been at the predefined location at the set time. For example, the user of mobile station 104 may set a location and a time of 8 p.m., even though it is only 3 p.m. In this example, the server 110 can determine mobile stations 118 that have been at the set location at a prior 8 p.m. a predetermined portion of the time, and transmit to mobile station 104 those mobile stations that are likely to be at the set location and time, based off of past history of the particular types of mobile stations 118. The server 110 may additionally predict the location of user of mobile station 104 at certain times, etc., using past history data of the user's mobile station 204. This prediction information of user may be subsequently used to predict and/or identify mobile stations 118 that will likely be at locations at similar times as user of mobile station 204. Accordingly, server 110 can provide contact information of mobile stations 220 using predictive location/time information of mobile stations 104, 118.

For each of the identified one or more mobile station types 118, a step includes identifying additional contact information associated with the mobile stations 118 of a particular type (Step 404). Contact information associated with mobile stations 118 of a particular type can include a name, phone number, email address, or other method for communicating with the user of the particular mobile station 118. Server 110 then responds to the inquiry received from the requesting mobile station 104. Server 110 can respond by transmitting, through a wireless communications network 106, to the mobile station of the user 104, information of the mobile stations 118 of the particular type (Step 406). Such information may include location information and contact information associated with the mobile stations 118, as well as additional information.

In addition to the above, there are other examples for obtaining a review or demonstration of particular types of mobile station 118 using various implementations of the proximate device locator service. In one example, depicted in FIG. 6, a user can obtain a review, demonstration, etc. of a particular type of mobile station 118 using one or more social media networks 600, e.g., Facebook™, Twitter™, etc.

The social media network 600 can include one or more processors 602 and databases 604. Information posted on the social media network (e.g., by friends of the user) may be saved on the social media network database 604, and presented on the social media network 600 via one or more processors 602. In one example, a user can identify contact information (e.g., name, telephone number, location information, email address, etc.) of users of a particular type of mobile station 118, who are friends of, or otherwise connected to, the user via at least one social media network 600. In this example, the user provides contact information of friends, or the like, to server 610 via wireless network 606. The contact information may include social media networks 600 to which the user's friends belong, and for which the user has relationships with on a social media network 600.

The term "friends," for purposes of this disclosure, will be used to mean a person or entity who has a social media connection with the user, or another user. The term is not intended to be limited to any particular social media network or device. For example, users having a social media network connection on Twitter™, Facebook™, etc., will be considered friends for purposes of this disclosure.

The user may provide the contact information of his/her friends to server 610 by many and various devices and methods. As one example, depicted on FIG. 6, the user may provide contact information to server 610 by way of network 606. In this example, the user may send telephone numbers from user's contact list stored on the user's mobile station 104. Alternatively, a list of friends may be automatically obtained by the server 610 using the user's contact list located on mobile station 104. Alternatively, or in addition to, the user's friends may be manually uploaded by the user, or by any other suitable process for obtaining and identifying other users and friends of a user's social media network 600. Similar to the above-discussed permission structure, only users of mobile station 104 that consent to providing information will have the information sent to server 610.

In addition to providing contact information and social media network information of other users, the user of station 104 may provide the particular type of mobile stations 118 for searching purposes. For example, the user of station 104 may search for a particular type of mobile station 118 to determine if that particular mobile station type 118 has been used by one or more of the user's friends. In such an example, the user may also search for a particular type of mobile station 118 within a certain location (e.g., an X-phone within a certain distance from mobile station 104), to determine if the particular type of mobile station 118 has been used by one or more of the user's friends within a distance of mobile station 104. Thus, the user may provide to server 610 contact information, one or more social media networks 600, a location to search, and an identification of the particular type of mobile station 118 that is of interest to the user of mobile station 104.

Figure 6:
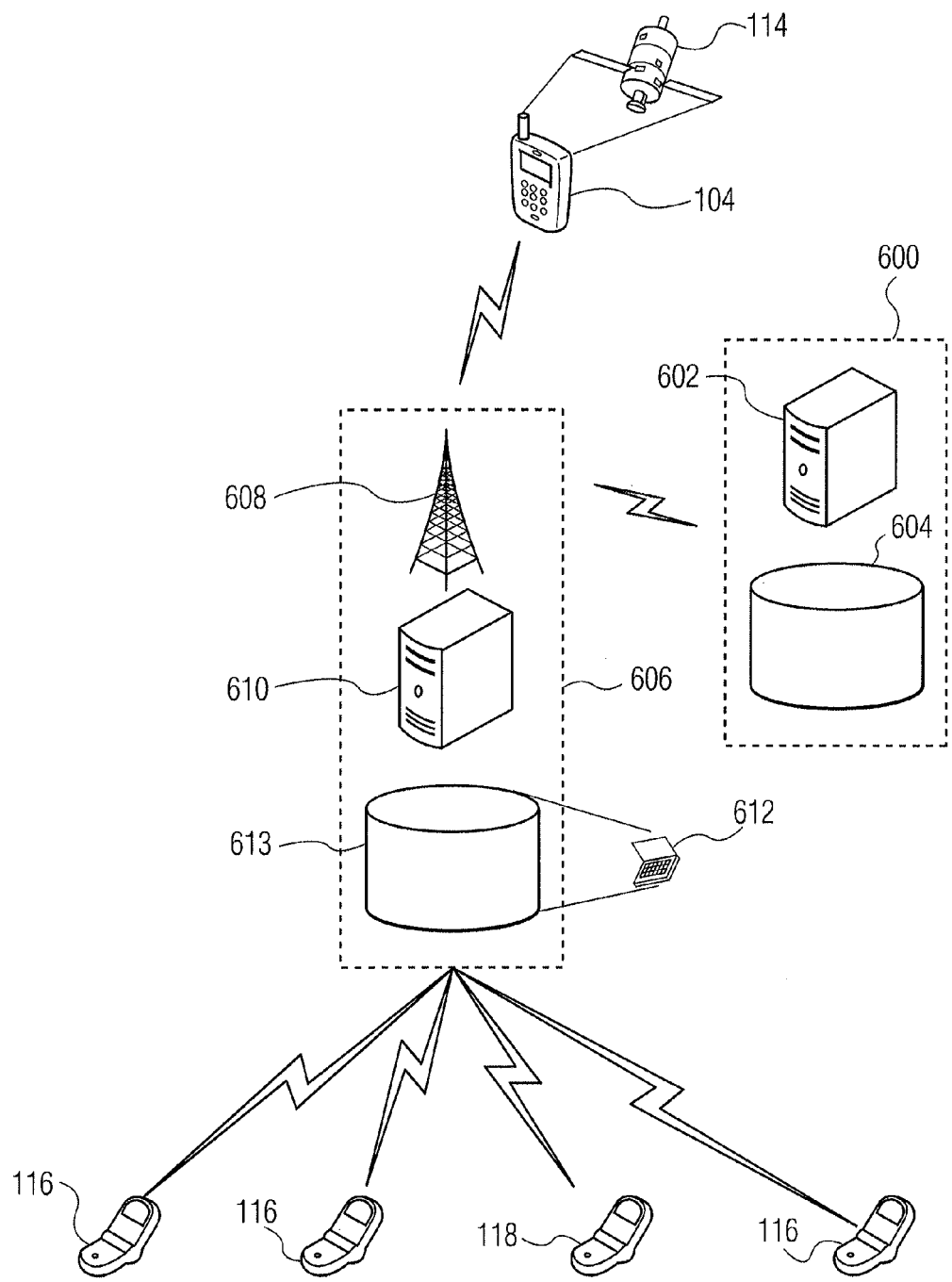
FIG. 6 illustrates a simplified network diagram in an example including a social media network.

In an example, depicted in FIG. 6, server 610 searches social media networks (e.g., profiles, pages, posts, etc. of the social media network 600) of the users. Server 610 searches the social media networks 600 for reference, in a message, etc., to a desired mobile station type 118. The different types of messages, and methods of messaging, that are used on social media networks 600 are known. For example, a user may declare on his or her page within a social media network that he/she has purchased, or otherwise acquired, a mobile station of a particular type (e.g., make and model). Thus, server 610 may parse through all messages, posts, pages, etc. of the user's friends social media networks for indications of the particular types of mobile stations 118.

Alternatively, in other examples, server 610 may parse tags, or other metadata, deposited on a friend's social media network 600 via the particular mobile station 118. These tags or other metadata, for example, may be embedded on a social media network 600 when a friend uses the particular type of mobile station 118, for example, to post a message on the social media network 600. These tags may, or may not, be viewable on the user's page (e.g., the tags may be hidden from viewers). Either way, however, server 610 parses these tags and other metadata to determine other users who have owned, own, or otherwise have used the particular type of mobile station 118.

Figure 7:
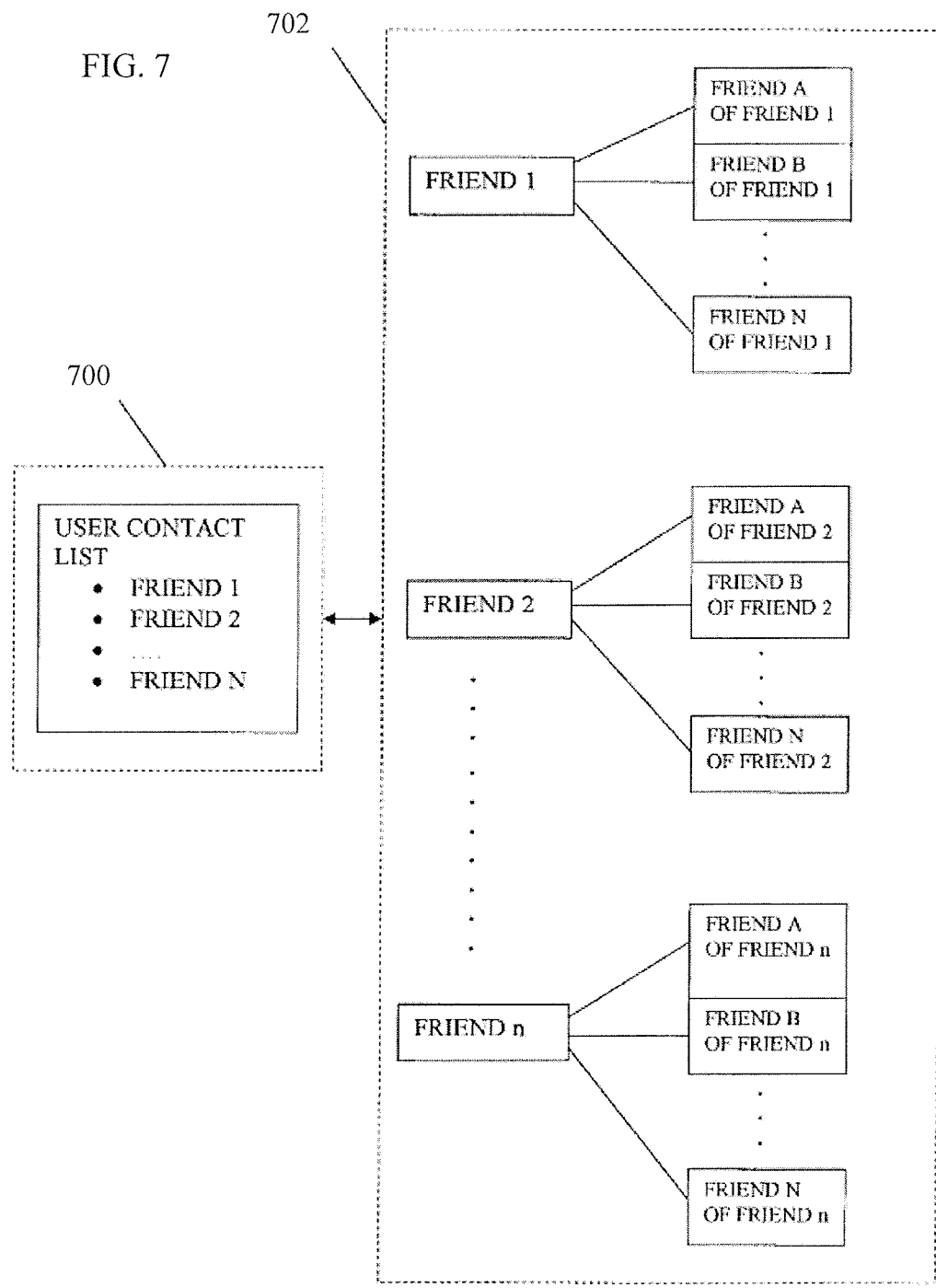
FIG. 7 is a high level block diagram of content and relationships of a user mobile station and a social media network.

As shown in FIGS. 6 and 7, a contact list 700 of a user's mobile station 104 may be used to designate and provide the user's friends to server 610. In one example, the user's contact list is sent wirelessly to server 610 via network 606. The contact list 700 of a user provides to server 610 the contact information and social media network 600 associated with friend 1, friend 2, etc. . . . Thus, the social media network 600 entries of friend 1 through friend N can be searched and parsed by server 610 for information regarding the particular type of mobile station 118.

Information regarding a particular mobile station type 118, however, may not be limited to a user's friend. Information regarding a particular type of mobile station 118, for example, may include friends of the user's friends, etc. Relationships involving friends of friends is depicted in 702 of FIG. 7. Although more than two degrees of separation is possible, it will be understood that one can optimize the degrees of separation in order to provide the greatest likelihood that the selected other user responds to the request for information.

Figure 5:
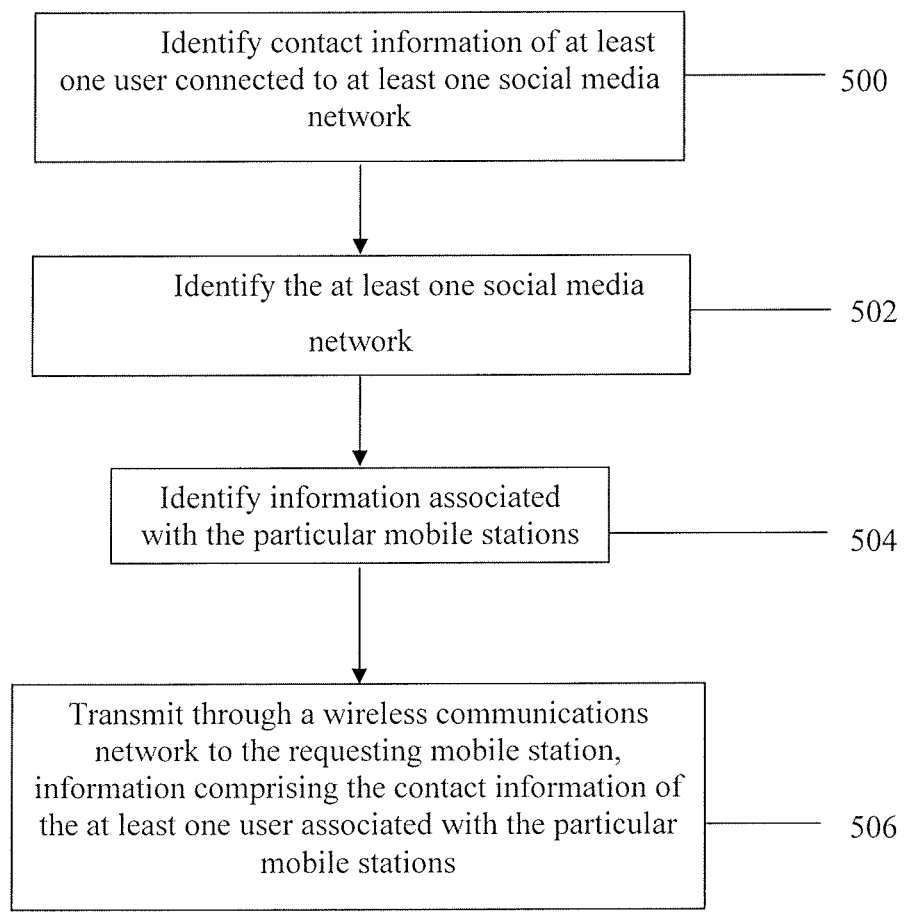
FIG. 5 is a flow chart outlining another example of a searching method.

FIG. 5 illustrates an example of a location based method of delivering a review, demonstration, etc. of one or more mobile stations 118 of a particular type, using a social media network 600. As discussed above with reference to FIG. 4, FIG. 5 relates to examples depicted in FIG. 1. However, FIG. 5 should not be limited to the examples of that figure.

The method depicted in FIG. 5 may include identifying contact information of users connected to at least one social media network 600 (Step 500). In an example, the contact information can be provided by way of user of mobile station 104, and include a name, telephone number, social media handle, etc., or a combination thereof. A social media network 600 related to the above contact information is identified, for example, by user of mobile station 104 (Step 502). This step can include the user of mobile station 104 providing a list of social media networks 600 to which other users, e.g., users of mobile stations 118 of a particular type, are associated with. In another example, this step may include the user of mobile station 104 selecting, from a list, any number of social media networks 600 to which the user of mobile station 118 of the particular type may belong.

Then, information about the particular mobile station type 118 is identified, e.g., the make, model, or other characteristics identifying the type of mobile station 118 (Step 504). Finally, mobile station 104 transmits to server 110, or other device, the information of mobile station 118 of the particular type. In other examples, mobile station 104 may also transmit additional information necessary for performing a search of the social media networks, e.g., passwords for various social media networks, etc. Server 110 uses the transmitted information to search the identified social media networks 600 for users of mobile stations 118 of the type identified by the user of mobile station 104.

Figure 8:
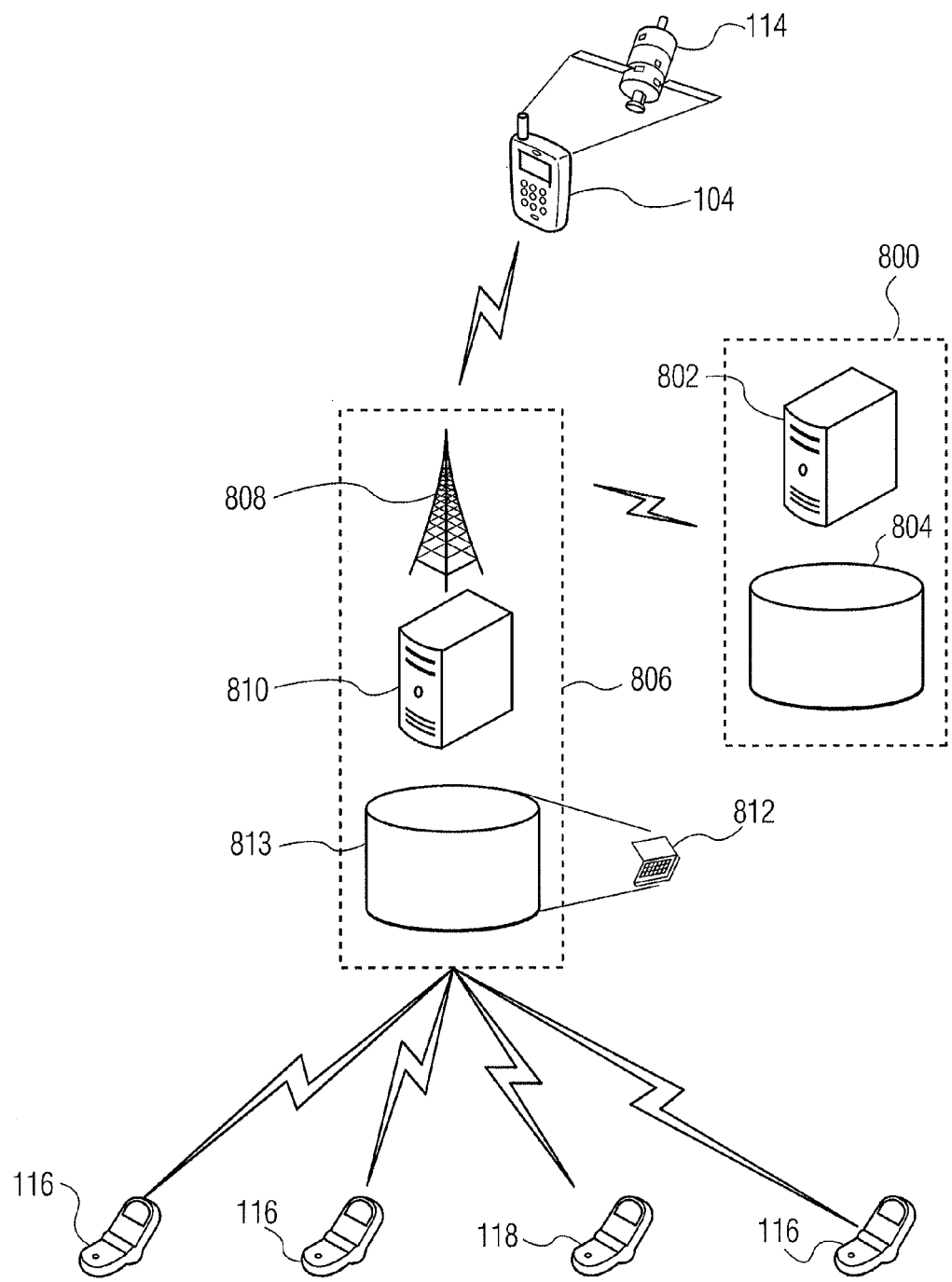
FIG. 8 illustrates a simplified network diagram in an example including a mobile station store.

FIG. 8 relates to another method and system of obtaining contact information (e.g., telephone number, email address, etc.) of a person or entity who has purchased, obtained, or used a particular type of mobile station 118. This method and system relates to information being provided to the user of mobile station 104 via a mobile station store 800. As an example, when a user purchases a mobile station at a mobile station store 800, the user typically provides his/her contact information (e.g., name, email address, etc.) to the mobile station store 800. This information is stored in one or more mobile station store databases 804, and is accessible via one or more store processors 802. A user may allow others to access this contact information using examples of the locator service processing outlined above.

The user may desire to obtain contact information of another user who has purchased a particular type of mobile station 118 at a mobile station store 800. In one example, a user may obtain the contact information of users who have purchased a particular type of mobile station 118 from the mobile station store 800. The user can obtain this information from mobile station store 800 via wireless network 806. In one example, the contact information may include users who are known and unknown to user.

An example method includes the user designating, to the mobile station store 800, other users who are known to the user. In this example, the user may provide to mobile station store 800 a list of other users, for example, via a contact list found in user's mobile station 104. Other examples may include the user manually providing the contact information of the other users. Using this list, the mobile station store 800 may search its database 804 to identify users of the list having a mobile station 118 type. In other examples, the user may request that the search of the particular type of mobile station 118 be limited to a location or region, e.g., within a certain distance from mobile station 104.

In these examples, mobile station store 800 searches for the indicated users having the indicated particular type of mobile station 118. Such search may include using processors 802 searching databases 804 for record of the indicated users purchasing, maintaining, or otherwise using the particular type of mobile station 118 at the mobile station store 800. If mobile station store 800 has a record of at least one indicated user being associated with the particular type of mobile station 118, the mobile station store 800 provides such information to the user of mobile station 104. In one example, mobile station store 800 notifies server 810 that at least one of the indicated users has had an association with the particular type of mobile station 118, identified by user. In this example, server 810, via network 806, provides the contact information to user. The user can obtain a review, demonstration, etc. of the particular mobile station 118 by contacting the other users, as discussed throughout this disclosure.

Referring back to FIG. 1, the proximate device locator service can utilize information about mobile stations 104, 116, 118 operating on the network 106, or any subset of such stations. In an example, information will only be transmitted and/or received according to aspects of the proximate device locator service utilizing permission devices or methods. Thus, information will only be transmitted or received from and to users of mobile stations 104, 116, 118 who expressly give their permission to download the application, and/or to receive and provide information to other users of the proximate device locator service. These permissions may reside on server 110, database 112, and/or on each respective mobile station 104, 116, 118. In an example, permissions may be input into mobile stations 104, 116, 118 by the user, and transmitted to server 110 or database 112, via network 106. Service 110, or another device, may control the access of information received, provided, or saved on respective mobile stations 104, 116, 118 according to the amount, or type, of permissions set by the user on the mobile stations.

In an example, a user of the mobile station 104, 116, 118 may download software (e.g. applications, or "apps") onto each respective mobile station 104, 116, 118. Typically, prior to downloading, or upon initial set-up of the application on the mobile station, the user is asked if he/she accepts or rejects conditions for participation in the proximate device locator service. Such conditions may include permission for the proximate device locator service application to modify the device programming or configuration, as well as permission to provide contact information (e.g., telephone numbers, location information, etc.), or other personal information to service users across the network 106. The user of the mobile station 104, 116, 118 may accept or reject the terms of the agreement. If the user rejects the conditions, the application is not downloaded; or if downloaded, the application is deactivated and may be removed. Alternatively, if the user of the mobile station 104, 116, 118 accepts the conditions, the application is downloaded/activated. Acceptance of some minimum conditions may be required to download, install and activate the application, whereas other conditions or permissions may be discretionary, as discussed more fully below.

Permissions may be modified after downloading the software. Thus, a user of a mobile station 104, 116, 118 may initially accept some amount of conditions, or all of the conditions, for downloading and/or activation of the application. This user may subsequently change his/her mind on the amount of permissions to provide, and may decide to provide no permissions at all. In such instances, the application may be deactivated or removed from mobile station 104, 116 118, as discussed above. Thus, only contact/location information consented to will be provided to other mobile stations.

Further, a user may accept a portion of the conditions for download and/or activation of the application, but not accept all conditions. Such user's acceptance may occur either at initial installation, or by later changing the permissions associated with the service. In this example, only the portion of the features accepted by the user is provided. For example, a user may allow contact information of mobile station 104, 116, 118 to be sent, but prevent location information of the mobile station 104, 116, 118 to be sent. Alternatively, a user may allow contact information and location information to be provided, but restrict location information to the city or state in which the mobile station is located, rather than more granular location information (e.g., a street address). In these examples, the mobile station 104, 116, 118 may only receive or provide information (e.g., contact/location information) that the mobile station 104, 116, 118 consents to providing and/or receiving that information. Such restrictions can occur via processing in server 110, or via user's mobile station 104, 116, 118.

Further, server 110 can sort and filter permissions provided by the users of mobile stations 104, 116, 118. The sorted/filtered results can be recorded in server 110, or may be stored in database 112. For example, users allowing the least restrictive access (e.g., access to all contact information, at any time) may be sorted such that these users are placed on the top of a list stored in database 112. In this example, the user of mobile station 104 can view the least restrictive information first. Conversely, information relating to users allowing the least access may be hidden from the user, or otherwise recorded at the bottom of the list stored in database 112. Thus, users will not be required to manually search through contact information to determine which mobile stations are providing the most relevant, or restrictive, information. This, for example, can result in a streamlined method for users of mobile stations 104, 116, 118 to search for types of mobile stations 118 that are available for in-person reviews and demonstrations.

Incentives may also be given to the user of a mobile station 104, 116, 118 to download the application and to provide information according to aspects of the proximate device locator service. Examples of such incentives may include reduced monthly rates for the mobile station 104, 116, 118, a flat fee paid to the user of a mobile station 118 for each review, etc. In such examples, server 110 can record mobile stations who are participating in the proximate device locator service. Server 110, or another device, can further process reviews, demonstrations, etc., and notify a billing database (not shown) that a credit, or a deduction, is owed to the user of the participating mobile station 104, 116, 118. Those skilled in the art will understand the many and various ways in which users of a mobile station 104, 116, 118 may be incentivized to receive and provide reviews and demonstrations according to aspects of the proximate device locator service.

As shown by the discussion above, some aspects of the proximate device locator service may be implemented on a general purpose data processing device, e.g. configured with appropriate server programming and/or to store and search an appropriate database. The technology outlined above also encompasses programming, for example, for such a computer, and in some cases at least, for a mobile station or other type of networked station.

A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the mobile stations, locations and contact information lists. The server and/or database search programming comprises programming code executable by the processor(s) of the computer platform(s) implementing those functions of the locator service system.

If provided, a proximate device location application for the mobile station would include programming code executable by a microprocessor of the mobile station 104, e.g. from storage in a flash memory. For downloading and installation, however, the application software is stored within a general-purpose computer platform and sent to the mobile station 104 through the communication network 106.

Figure 9:
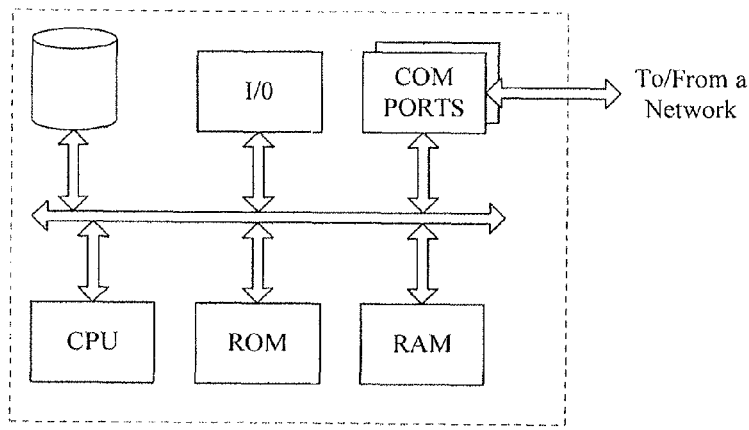
FIG. 9 is a simplified functional block diagram of a computer that may be configured as a host or server.
Figure 10:
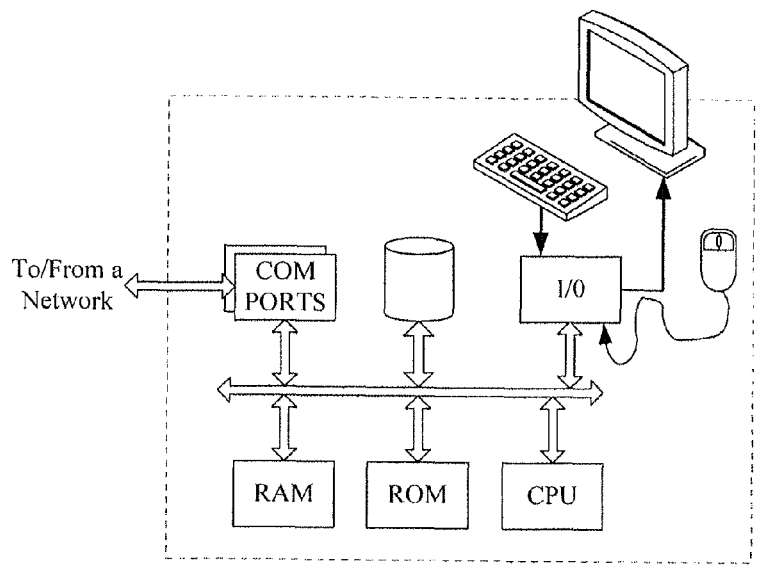
FIG. 10 is a simplified functional block diagram of a personal computer of other workstation or terminal device.

FIGS. 9 and 10 provide functional block diagram illustrations of general purpose computer hardware platforms. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server if appropriately programmed. It is believed that those skilled in the art are familiar with the structure, programming and general operation of such computer equipment and as a result the drawings should be self-explanatory.

A computer for a server function, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar computer platforms, to distribute the processing load.

Hence, aspects of the methods outlined above may be embodied in programming. Program aspects of the technology may be thought of as "products" or "articles of manufacture" typically in the form of executable code and/or associated data about various stations involved in the proximate device locator service that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software programming from a computer or processor into the server computer or into the mobile station, for example, from a another computer of the mobile network operator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible or non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RE) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method, comprising steps of:
   receiving, at a server, an inquiry for information about networked stations of a particular type, from a requesting networked station;
   identifying, at the server, a first location of the requesting networked station using global positioning system (GPS) signals or trilateration of the requesting networked station;
   monitoring a respective second location of each of other networked stations using GPS signals or trilateration;
   based on each respective second location of each of the other networked stations, identifying, at the server, a subset of the other networked stations having the respective second location within a predefined radius of the identified first location of the requesting networked station, and each of the other networked stations in the subset being of the particular type;
   for each respective one of the other networked stations in the subset of the particular type, identifying, at the server, contact information associated with the respective networked stations of the particular type;
   identifying, at the server, in association with the respective second location of each networked station in the subset of the particular type, a total number of networked stations in the subset of the particular type that are located at each identified second location;
   sorting, at the server, identifications of networked stations in the subset of the particular type according to the respective second location of each networked station in order of most to least total number of the networked stations in the subset of the particular type at each identified second location; and
   responsive to the inquiry received from the requesting networked station, transmitting, from the server, through a communications network to the requesting networked station, information comprising the contact information associated the each networked stations in the subset of the particular type to display according to the sorted identifications of the networked station in the subset.

2. The method of claim 1, further comprising steps of:
   identifying permissions set on the networked stations in the subset of the particular type, wherein the permissions include allowing or denying access to the information comprising the contact information associated with the networked station of the particular type; and
   filtering the information, for the transmitting step, based on permissions set on the networked stations in the subset of the particular type so that the requesting networked station receives only the information comprising the contact information of networked stations in the subset of the particular type having permissions allowing access to the contact information.

3. The method of claim 1, wherein the contact information for each of the network stations in the subset of the particular type includes at least one of a telephone number, an email address, the respective second location, a distance from the requesting networked station to the respective networked station in the subset of the particular type, and a social media network handle.

4. The method of claim 1, wherein:
   the requesting networked station is a mobile station,
   the networked stations of the particular type are mobile stations, and the communications network comprises a wireless communications network configured to provide communications to and from the requesting networked station and the networked stations in the subset of the particular type.

5. The method of claim 1, further comprising steps of:
collecting the contact information associated with the respective networked stations in the subset of the particular type using probes, wherein the probes are built into an application of each of the networked stations of the particular type; and
transmitting, through a communications network to the requesting networked station, information comprising the collected contact information associated with the networked stations in the subset of the particular type.

6. The method of claim 1, further comprising steps of:
identifying, in association with the respective second location of each networked station in the subset of the particular type, a time or time frame at which each of the respective networked stations in the subset of the particular type will be within the set distance of the first location; and
for each respective one of the identified time or time frame, identifying contact information associated with the respective networked stations in the subset of the particular type that are within the set distance of the first location; and
transmitting the identified time or time frame, and the identified contact information associated with the respective networked stations in the subset of the particular type, to the requesting networked station.

7. A system, comprising:
an interface for communications with a requesting networked station via a communication network;
a processor coupled to the interface;
a storage device accessible to the processor;
programming for execution by the processor, stored in the storage device;
wherein execution of the programming of the processor configures the system to perform functions, including functions to:
  receive an inquiry for information about a networked station of a particular type, from the requesting networked station;
  identify a first location of the requesting networked station using global positioning system (GPS) signals or trilateration of the requesting networked station;
  monitor a respective second location of each of the other networked stations using GPS signals or trilateration;
  based on each respective second location of other networked stations, identify a subset of the other networked stations having the respective second location within a predefined radius of the identified first location of the requesting networked station, and each of the other networked stations in the subset being of the particular type;
  for each respective one of the networked stations in the subset of the particular type, identify contact information associated with the respective networked station of the particular type;
  identify, in association with the respective second location of each networked station in the subset of the particular type, a total number of networked stations in the subset of the particular type that are located at each identified second location;
  sort identifications of networked stations in the subset of the particular type according to the respective second location of each networked station in order of most to least total number of the networked stations in the subset of the particular type at each identified second location; and
  responsive to the inquiry received from the requesting networked station, transmitting through a communications network to the requesting networked station, information comprising the contact information associated with each networked station in the subset of the particular type to display according to the sorted identifications of the networked stations in the subset.

8. The system of claim 7, wherein the contact information for each of the networked stations in the subset of the particular type includes at least one of a telephone number, an email address, the respective second location, a distance from the requesting networked station to the respective networked station in the subset of the particular type, and a social media network handle.

9. The system of claim 7, wherein execution of the programming of the processor configures the system to perform further functions, including functions to:
  identify permissions set on the networked stations in the subset of the particular type, wherein the permissions include allowing or denying access to the information comprising the contact information associated with the networked station of the particular type; and
  filter the information, for the transmitting step, based on permissions set on the networked stations in the subset of the particular type so that the requesting networked station receives only the information comprising the contact information of networked stations in the subset of the particular type having permissions allowing access to the contact information.

10. The system of claim 7, wherein:
the requesting networked station is a mobile station,
the networked stations of the particular type are mobile stations, and
the communications network comprises a wireless communications network configured to provide communications to and from the requesting networked station and the networked stations in the subset of the particular type.

11. The system of claim 7, wherein execution of the programming of the processor configures the system to perform further functions, including functions to:
  collect the contact information associated with the respective networked stations in the subset of the particular type using probes, wherein the probes are built into an application of each of the networked stations of the particular type; and
  transmit, through a communications network to the requesting networked station, information comprising the collected contact information associated with the networked stations in the subset of the particular type.

12. The system of claim 7, wherein execution of the programming of the processor configures the system to perform further functions, including functions to:
  identify, in association with the respective second location of each networked station in the subset of the particular type, a time or time frame at which each of the respective networked stations in the subset of the particular type will be within the set distance of the first location; and
  for each respective one of the identified time or time frame, identify contact information associated with the respective networked stations in the subset of the particular type that are within the set distance of the first location; and transmit the identified time or time frame, and the identified contact information associated with the respective networked stations in the subset of the particular type, to the requesting networked station.

13. The system of claim 7, wherein the first location of the requesting networked station is identified using GPS signals received from three satellites of a GPS constellation.

14. The system of claim 13, wherein the first location of the requesting networked station is identified using GPS signals received from three or more satellites of the GPS constellation.

15. The system of claim 7, wherein the first location of the requesting networked station is identified using trilateration of the requesting network station.

16. The system of claim 11, wherein the probes transmit the contact information each time a search application is used.

17. The method of claim 1, wherein the first location of the requesting networked station is identified using GPS signals received from three satellites of a GPS constellation.

18. The method of claim 17, wherein the first location of the requesting networked station is identified using GPS signals received from three or more satellites of the GPS constellation.

19. The method of claim 1, wherein the first location of the requesting networked station is identified using trilateration of the requesting networked station.

20. The method of claim 5, wherein the probes transmit the contact information each time a search application is used.

* * * * *